United States Patent [19]

Pearson

[11] Patent Number: 5,716,070
[45] Date of Patent: Feb. 10, 1998

[54] BACK SPLASH

[76] Inventor: Douglas W. Pearson, 115 Gateway Dr., Breckenridge, Colo. 80424

[21] Appl. No.: 621,663

[22] Filed: Mar. 26, 1996

[51] Int. Cl.$^6$ .................................................. B62J 15/02
[52] U.S. Cl. ................................. 280/852; 280/152.1
[58] Field of Search ............................. 282/852, 851, 282/848, 154, 158.1, 152.1, 160.1; 293/41; 297/184.11

[56] References Cited

U.S. PATENT DOCUMENTS

| | | | |
|---|---|---|---|
| 896,580 | 8/1908 | Robeson | 280/852 |
| 2,590,664 | 3/1952 | Weaklend | 297/184.11 |
| 3,537,746 | 11/1970 | Peters | 297/184.11 |
| 4,171,145 | 10/1979 | Pearson | 297/184.11 |
| 5,080,431 | 1/1992 | Frazier | 297/184.11 |
| 5,120,073 | 6/1992 | Seak, Jr. | 280/852 |
| 5,322,311 | 6/1994 | Dann | 280/152.1 |
| 5,562,296 | 10/1996 | Hall et al. | 280/152.1 |

FOREIGN PATENT DOCUMENTS

| | | | |
|---|---|---|---|
| 400581 | 3/1925 | Germany | 280/85 |

*Primary Examiner*—Richard M. Camby
*Attorney, Agent, or Firm*—Joseph H. McGlynn; Patent & Trademark Services, Inc.

[57] ABSTRACT

A retractable bike fender or cover that will extend over the rear or front tire of a bicycle during inclement weather or riding conditions. The cover is mounted on a reel behind the seat and can be pulled out to cover the tire. The cover is attached to a support structure that can be mounted on the bicycle frame. The support structure can be at a fixed or adjustable height above the tire. In addition, the reel can be spring biased to retract the cover or the reel can be non-spring biased so the cover can be manually retracted.

8 Claims, 1 Drawing Sheet

U.S. Patent
Feb. 10, 1998
5,716,070
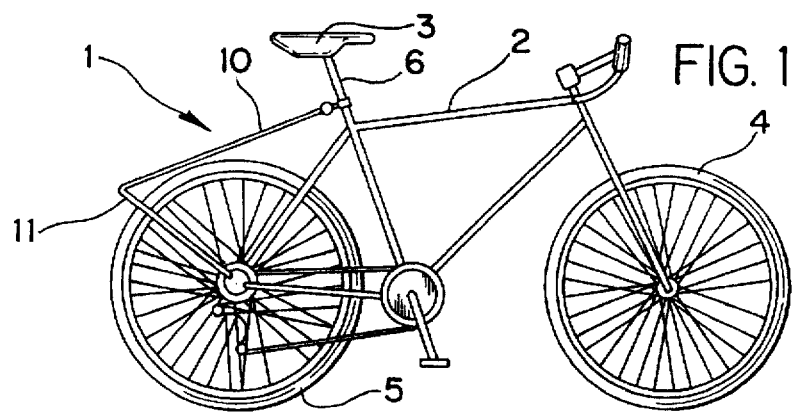
FIG. 1
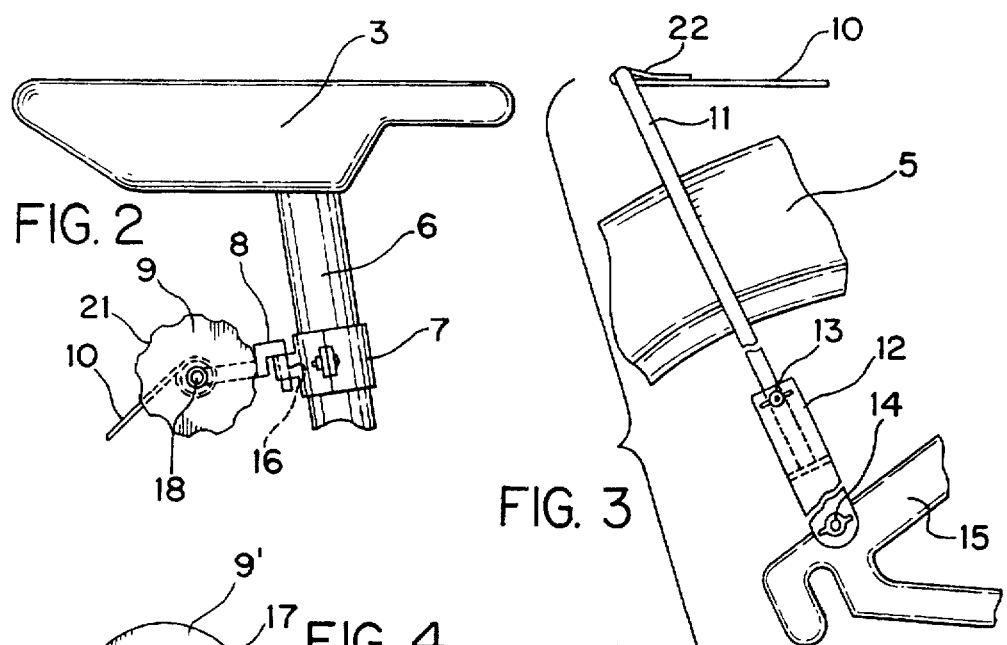
FIG. 2
FIG. 3
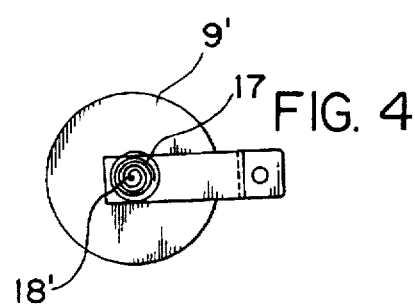
FIG. 4
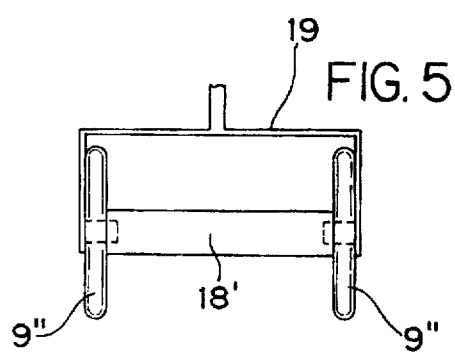
FIG. 5
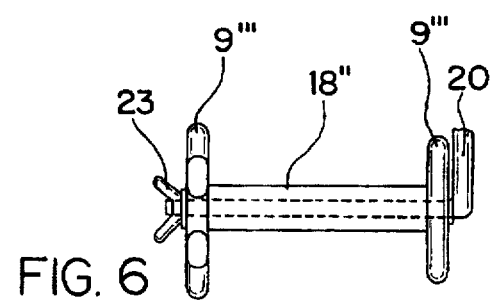
FIG. 6

5,716,070

BACK SPLASH

BACKGROUND OF THE INVENTION

This invention relates, in general, to a protective covering, and, in particular, to a protective covering for preventing water from being splashed onto a rider of a bicycle.

DESCRIPTION OF THE PRIOR ART

In the prior art various types of protective covers have been proposed. For example, U.S. Pat. No. 2,590,664 discloses a seat cover for a outdoor vehicles which covers the seat from the elements when the vehicle is not being used. U.S. Pat. No. 3,537,746 discloses a retractable seat cover for a motorcycle. U.S. Pat. No. 4,171,145 discloses a retractable seat cover for a motorcycle which is unrolled from a spring loaded spool mounted in a housing behind the motorcycle seat. U.S. Pat. No. 5,080,431 discloses a protective cover for a motorcycle which can be retracted into a housing beneath the seat.

All of the prior art devices are concerned with the protection of the seat upon which the bike rider sits. None of the prior art devices concern themselves with protecting the rider from water, mud and other debris thrown up by the centrifugal force of bike tires when the bike is ridden through wet and/or dirty terrain.

The present day bike rider utilizes their bicycles for a variety of purposes, including pleasure trips, running errands, and commuting to and from work. During these trips it is desirable that the rider's clothing remain clean and presentable. There is presently an unmet need for a convenient bicycle fender to meet this need. The fender or cover should be retractable so it can be stored when not needed and must be easily and quickly deployed by the rider when necessary.

Although other types of bike fenders are available, they are permanently attached to the frame of the bicycle and heavy (with respect to modern bicycle standards). There is a need for a bicycle fender or cover that can be easily and quickly extended when needed, and retracted when not needed.

The present invention can be easily installed on all bicycles with simple hand tools, and just as quickly removed and moved to another bicycle if necessary. In addition, this device can be installed on the front as well as the rear wheel with minor adjustments. The design allows for the fender or cover to be constructed of strong, light weight materials and is compactable enough to be stored in a day pack. also, this design allows the protective cover to be wider than conventional bike fenders and therefore, will provide a greater degree of protection for the rider.

SUMMARY OF THE INVENTION

The present invention is directed to a retractable bike fender or cover that will extend over the rear or front tire of a bicycle during inclement weather or riding conditions. The cover is mounted on a reel behind the seat and can be pulled out to cover the tire. The cover is attached to a support structure that can be mounted on the bicycle frame. The support structure can be at a fixed or adjustable height above the tire. In addition, the reel can be spring biased to retract the cover or the reel can be non-spring biased so the cover can be manually retracted.

It is an object of the present invention to provide a retractable bike fender or cover that will protect a bike rider from water, mud and other debris thrown up by the centrifugal force of bike tires when the bike is ridden through wet and/or dirty terrain.

It is an object of the present invention to provide a retractable bike fender or cover that can be attached to any bicycle.

It is an object of the present invention to provide a retractable bike fender or cover that can be attached to cover the rear or front tires on a bicycle.

It is an object of the present invention to provide a retractable bike fender or cover that can be attached using simple hand tools.

It is an object of the present invention to provide a retractable bike fender or cover that can be retracted or extended quickly and easily by the rider.

These and other objects and advantages of the present invention will be fully apparent from the following description, when taken in connection with the annexed drawings.

BRIEF DESCRIPTION OF THE DRAWINGS

FIG. 1 is a side view of the present invention mounted on a bicycle.

FIG. 2 is a side view of the take up reel of the present invention mounted on a bicycle.

FIG. 3 is a side view of the cover of the present invention attached to the frame of a bicycle.

FIG. 4 is a side view of of the spring biased reel of the present invention.

FIG. 5 is a view of a modified reel of the present invention.

FIG. 6 is a side view of a second modified reel of the present invention.

DESCRIPTION OF THE PREFERRED EMBODIMENT

Referring now to the drawings in greater detail, FIG. 1 shows the present invention 1 mounted on a bicycle having a frame 2, a seat 3, front wheel 4, and rear wheel 5. It should be noted that although a particular type of bicycle is illustrated, the invention is not limited to be used with any specific bicycle, and can be attached to any and all types of bicycles.

FIG. 2 shows a take up reel 9 around which is wrapped a flexible fender or cover 10. The flexible fender or cover 10 is made from a material such as, but not limited to, nylon. The material should be light weight, waterproof and flexible enough to be wound upon the reel 9, which is mounted on an axle 18. The reel can be attached to the bicycle at one end by a hook 8 which is engaged in an aperture 16 in a clamp 7 which is attached to seat support 6. The clamp can be attached to the seat support 6 by bolts or any other conventional clamping means that will perform the intended function. The take up reel 9 has undulations 21 to make it easier to turn the reel when the cover is to be retracted. Other means such as a roughened surface or a crank could also be used to help turn the take up reel 9.

FIG. 3 show the attachment of the other end of the cover 10 to the frame 15 of the bicycle near where the rear wheel 5 is secured to the frame. The cover 10 can be attached to a rod 11 by any conventional means such as looping the cover shown at 22 around a horizontal portion of the rod (not shown). The loop can be secured to the rest of the cover by any conventional means such as, but not limited to, gluing or sewing. The rod 11 will slide within a cylinder or hollow rod 12 in order to adjust the height of the cover 10 above the rear tire 5. The height of the rod 11 can be fixed by a thumb screw 13 which is threaded into the cylinder or hollow rod 12 and engages the rod 11 inside the cylinder or hollow rod 12. The cylinder or hollow rod 12 can be secured to the bicycle fame 15 by a bolt 14.

FIG. 4 shows a modified reel 9' which has a spring 17 wound around axle 18' to assist in retracting the cover 10. It should be noted that the reel 9' could also have undulations similar to undulations 21 in FIG. 2 in case the spring jams or breaks in order to make turning the reel easier in such circumstances.

FIGS. 5 and 6 show modified forms of the take up reel which can be used in place of reels 9 or 9'. The reel 9" has a U-shaped bracket 19 which supports the axle 18' upon which the reel is mounted and which will attach to the clamp 7 in the same manner as the reel 9 in FIG. 2. The reel shown in FIG. 6 has an axle 18" which is hollow and receives a rod 20 which is threaded at one end to receive a wing nut 23. The other end of the rod 20 is bent at a right angle to secure the reels 9''' to the axle and to provide a means for securing the reel to the bracket 7 shown in FIG. 2. The other end of the rod (not shown) could be provided with a hook similar to the hook 8 for this purpose.

In order to use the flexible fender or mud guard 10, it is only necessary for the rider to pull the rod 11 toward the rear of the bicycle. This will extend the cover 10 over the rear tire 5 (or the front tire 4 if the device is mounted on the front of the bicycle). The rod 11 can be secured in position by tightening the bolt 14. If the height of the cover 10 above the tire needs to be adjusted, the rider merely has to loosen thumb screw 13, move the rod 11 to the proper position and then tighten the thumb screw 13. This adjustment can be made with the cover extended or retracted.

Also, even though the rod 11 is shown as being adjustable in order to fit a variety of different sizes of bicycles or tires, however, this is not always necessary. The rod could be made in different sizes to fit different bikes. In this case the rods 11 and 12 could be made as a single piece and attached directly to the frame 15 by the bolt 14 shown in FIG. 3.

Although the retractable bike fender or cover and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A retractable tire cover for covering the tires on a bicycle to prevent water, mud, or debris form being thrown onto the bike rider comprising:

reel means for holding a flexible cover wound thereon, one end of said cover attached to said reel means, means for mounting said reel means behind a bicycle seat and above at least one of said tires on said bicycle, means for attaching another end of said cover to a support means, said support means adapted to be pivotably attached to a frame member of said bicycle, means for holding said support means in at least one fixed position, whereby said support means can be moved from a first position where said cover is retracted onto said reel means and said cover is not over said at least one of said tires on said bicycle, to a second position where said cover is extended from said reel means and said cover is positioned over said at least one of said tires on said bicycle.

2. The retractable tire cover as claimed in claim 1, wherein said reel means has means spaced around its circumference for turning said reel.

3. The retractable tire cover as claimed in claim 1, wherein said means for mounting said reel means is a hook attached to said reel and a clamp adapted to be attached to a portion of said bicycle, said clamp having an aperture for receiving said hook.

4. The retractable tire cover as claimed in claim 1, wherein said support means is adjustable in a vertical direction.

5. The retractable tire cover as claimed in claim 1, wherein said support means comprises:

a rod having said another end of said cover attached to one end of said rod, another end of said rod being received in a hollow member, said hollow member adapted to be attached to a portion of said bicycle, said rod being slidable within said hollow member, means for holding said rod in a plurality of positions within said hollow member.

6. The retractable tire cover as claimed in claim 1, wherein said reel means is spring biased to maintain said cover in a retracted position.

7. The retractable tire cover as claimed in claim 1, wherein said means for mounting said reel means is a U-shaped bracket, each arm of said U-shaped bracket being attached to opposite ends of said reel means.

8. The retractable tire cover as claimed in claim 1, wherein said means for mounting said reel means is a rod which extends through said reel means, one end of said rod being screw threaded and a having a screw threaded fastener attached thereto, another end of said rod being bent, whereby said reel means will be secured between said screw threaded fastener and said bent end of said rod.

* * * * *